United States Patent [19]

Nakamura et al.

[11] 4,409,613
[45] Oct. 11, 1983

[54] SEPP-BASED DEFLECTION CONTROL CIRCUIT

[75] Inventors: Takashi Nakamura; Yoshihiro Morioka; Kazunori Yamaji, all of Atsugi, Japan

[73] Assignee: The United States of America as represented by the U.S. Department of Energy, Washington, D.C.

[21] Appl. No.: 354,307

[22] Filed: Mar. 3, 1982

[30] Foreign Application Priority Data

Mar. 4, 1981 [JP] Japan ................................ 56-31004

[51] Int. Cl.³ ............................................ H04N 9/09
[52] U.S. Cl. ...................................................... 358/51
[58] Field of Search ......................................... 358/51

[56] References Cited

U.S. PATENT DOCUMENTS

3,838,310 9/1974 Varian ................................ 358/51
4,318,124 3/1982 Nakamura et al. ................. 358/51

Primary Examiner—Richard Murray
Attorney, Agent, or Firm—Earl L. Larcher; Stephen D. Hamel; Richard G. Besha

[57] ABSTRACT

Deflection control apparatus for registering the electron beam, rasters of electrostatic-deflection pick-up tubes of a three-tube color television camera includes a compensating voltage generator with inputs connected to receive horizontal and vertical sawtooth deflection signals provided from a deflection signal generator, and outputs providing compensating voltages to adjust for size, skew, and rotation. A combining circuit is provided to add the deflecting signals to the respective compensating voltages to generate adjusted compensating voltages for application to respective electrostatic deflection plates of certain ones of the tubes. For each adjusted deflecting signal, the combining circuit includes a transistor circuit having an input electrode coupled to receive the associated compensating voltage and an output electrode connected through a load resistor to an output of the deflecting signal generator. A pair of SEPP-arranged transistors are provided with their bases connected to the output electrode of the transistor circuit and with their emitters coupled together, through like-value emitter resistors, to a respective deflection plate of one of the tubes. The SEPP-configured transistors permit a high impedance to be presented to the deflection signal generator to minimize the power consumption thereof, and a low resistance to be presented to the deflection plates, to keep the latter from undesirably integrating the deflection sawtooth voltages.

10 Claims, 5 Drawing Figures

SEPP-BASED DEFLECTION CONTROL CIRCUIT

BACKGROUND OF THE INVENTION

1. Field of the Invention

This invention relates to television cameras, and is more particularly directed to plural-tube type color television cameras having image pick-up tubes of the electrostatic deflection type. More specifically, this invention concerns deflection control circuitry in which deflection signals applied to the deflection circuit of an image pickup tube are adjusted to compensate for centering, size, skew, rotation, and the like.

2. Description of the Prior Art

Conventional television cameras utilize image pick-up tubes in which electron beams are scanned in the horizontal and vertical directions in a raster pattern on a photo-conductive target on which an optical image is incident. In a plural pick-up tube color television camera, the image is split into separate red, green, and blue portions, and provisions must be incorporated in the color television camera to ensure registration of the three images. For example, centering adjustment, size adjustment, skew adjustment, and rotation adjustment are usually necessary. In the centering adjustment, the center of the effective scan area is moved. In the size adjustment, the size of the effective scan area is changed. In the skew and the rotation adjustment, the effective scan area is rotated.

If the image pick-up tube is of the magnetic deflection type, the positions of the deflection coils can be mechanically adjusted to correct for centering, size, rotation, or skew. However, in an image pick-up tube of the electrostatic deflection type, electrical adjustment voltages must be added to the sawtooth horizontal and vertical deflection voltages in order to effect the various adjustments.

In a three-tube color television camera with image pick-up tubes of the electrostatic deflection type, deflection voltages are provided from common horizontal and vertical deflection circuits to the horizontal and vertical deflection plates of the respective three image pick-up tubes. Unfortunately, the horizontal and vertical deflection plates of the three image pick-up tubes are not completely identical, and can vary slightly from one another in mechanical characteristics, such as mounting position and size. Accordingly, if the adjusting voltage is merely added to the deflection voltage in the adjusting operation, the deflection relationships of the electron beam in the various image pick-up tubes will not coincide exactly. Therefore, because of the mechanical nonuniformities in the horizontal and vertical deflection plates, the three color images will not be in exact registration. Consequently, color misregistration and color shift will be apparent in any reproduced image provided from the picked-up television picture.

In other words, because of mechanical differences between the respective deflection plates of the various pick-up tubes, the raster scanned by, for example, the red tube may differ in size, location, or position on the target, relative to the corresponding raster scanned by the green and/or blue tubes. This variation in the "red" raster may be adjusted by superimposing the adjusting voltages onto the horizontal and/or vertical deflection voltages. However, since the same horizontal and vertical deflection voltages are supplied to the horizontal and vertical deflection plates, respectively, of all the tubes, a correction in the "red" raster may result in an undesired change or distortion in the "green" and/or "blue" rasters. Because the deflections of the red, green, and blue beams cannot be adjusted independently of each other, a proper adjustment in one may deleteriously affect the raster scanned by the others. As a result, distortion, interference, and noise may appear in the color television picture which ultimately is reproduced from the video signals derived from the color television camera.

In order to provide deflection adjustment circuitry avoiding the above problem, and permitting the deflection arrangements of the various image pick-up tubes to be adjusted independently, improved deflection control circuits have been previously proposed, for example in U.S. patent application Ser. No. 282,263, filed July 10, 1981 and in U.S. patent application Ser. No. 283,358, filed July 14, 1981, each of which has a common assignee herewith.

In these previously-proposed deflection control circuits, one of the three pick-up tubes (e.g., the green pick-up tube) is supplied with horizontal and vertical deflecting signals directly. These deflecting signals are also supplied to a compensating voltage generator which is selectively adjusted to produce respective horizontal deflection compensating voltages for each of the remaining (i.e., red and blue) pick-up tubes and respective vertical deflection compensating voltages for such remaining tubes. Separate horizontal and vertical combining circuits are provided for each of the remaining tubes. Each combining circuit is supplied with the respective horizontal or vertical deflection signal and is also supplied with a respective horizontal or vertical deflection compensating voltage generated by the compensating voltage generating circuit, and is operative to generate an adjusted horizontal or vertical deflection signal to be applied to the horizontal or vertical deflecting plates of its associated pick-up tube.

In one of these previously-proposed deflection control circuits, the combining circuits can each be constituted by a differential amplifier having an input electrode to which the appropriate deflection compensating voltage is applied, and a pair of output electrodes connected to respective load resistors to which complementary versions of the horizontal or vertical deflecting signal are furnished.

The differential outputs of the differential amplifier are then applied to the horizontal or vertical deflection plates of one of the red and blue pick-up tubes.

In the other of these previously proposed deflection control circuits, a pair of controllable current sources, such as junction transistors, have their output electrodes tied together, and this pair of controllable current sources serves as a combining circuit for generating the adjusted horizontal or vertical deflection signal. A correction voltage is applied to control electrodes of the current sources and the deflecting signals are supplied through an impedance to the output electrodes thereof, which then provide the adjusted deflection signal to the horizontal or vertical deflection plates of a respective one of the pick-up tubes.

Unfortunately, in these previously-proposed deflection control circuits, the horizontal and vertical deflecting signals are provided from low-output-impedance generating circuits, so the apparent output impedance of these circuits, from the point of view of the red and blue pick-up tubes, is substantially determined by the values of the impedances coupled to the output electrodes of the combining circuit.

In order to prevent the power consumption of the generating circuits from becoming excessive, the values of these impedances should be comparatively high. However, there is a substantial capacitance existing between the deflection plates as well as stray capacitance in other associated parts and leads of the tube. Thus, if the resistive values of the impedances coupled to the output electrodes are too high, the output electrodes are presented with a substantially capacitive load, and the plate capacitance and stray capacitance, coupled with the high output resistance, forms an RC integrator. This integrates the sawtooth waveforms used as the vertical and horizontal deflecting signals, and consequently distorts the raster of the scanned beam. Accordingly, the resistance values of the output impedances should be kept as low as possible.

OBJECTS AND SUMMARY OF THE INVENTION

It is an object of this invention to provide a deflection control circuit for use with a television camera having a plurality of image pick-up tubes to ensure that the deflection relationships of the respective electron beams coincide with one another, and which provides a comparatively high impedance to outputs of a deflection signal generating circuit while providing a comparatively low impedance to deflection plates of the image pick-up tubes.

It is another object of this invention to provide a deflection control circuit for use with a plural-tube color television camera, in which color shifting can be eliminated without distortion or the raster of the scanning electron beam thereof, and without imposing an excessive current drain on the deflection signal generating circuit of such plural-tube color television camera.

In accordance with an aspect of this invention, deflection control apparatus are provided for connecting the scanning of an electron beam in respective horizontal and vertical directions in at least one pick-up tube of a television camera having a plurality of pick-up tubes. a horizontal deflecting signal generating circuit and a vertical deflecting signal generating circuit each supply respective horizontal and vertical deflecting signals, preferably as sawtooth signals. The horizontal and vertical deflecting signals are provided to the horizontal and vertical deflection plates, respectively, of one of the pick-up tubes—normally, the green pick-up tube. A compensating voltage generating circuit has an input coupled to receive the horizontal and vertical deflecting signals and one or more outputs providing respective deflection compensating voltages for selected ones of the pick-up tubes, e.g., the red and blue pick-up tubes. A combining circuit is provided for combining the respective deflection compensating voltages with corresponding ones of the horizontal and vertical deflecting signals to generate adjusted horizontal and vertical deflecting signals, respectively, for application to the horizontal and vertical deflection plates of the selected pick-up tubes.

In order to carry out the principles of this invention, the combining circuit includes a transistor circuit having an input electrode coupled to receive the associated deflection compensating voltage and an output electrode coupled through a load resistor to an output of one of the horizontal and vertical deflecting signal generating circuits. A pair of complementary transistors are arranged in single-ended push-pull (SEPP) configuration, and have their bases coupled to the output electrode of the above-mentioned transistor circuit. The emitters of the SEPP-configured transistors are coupled through respective emitter resistors to one of the deflection inputs of the associated pick-up tube.

The above and other objects, features, and advantages of this invention will be more fully appreciated from the ensuing description of certain preferred embodiments, which is to be considered in connected with the accompanying drawings.

DETAILED DESCRIPTION OF CERTAIN PREFERRED EMBODIMENTS

Figure 1:
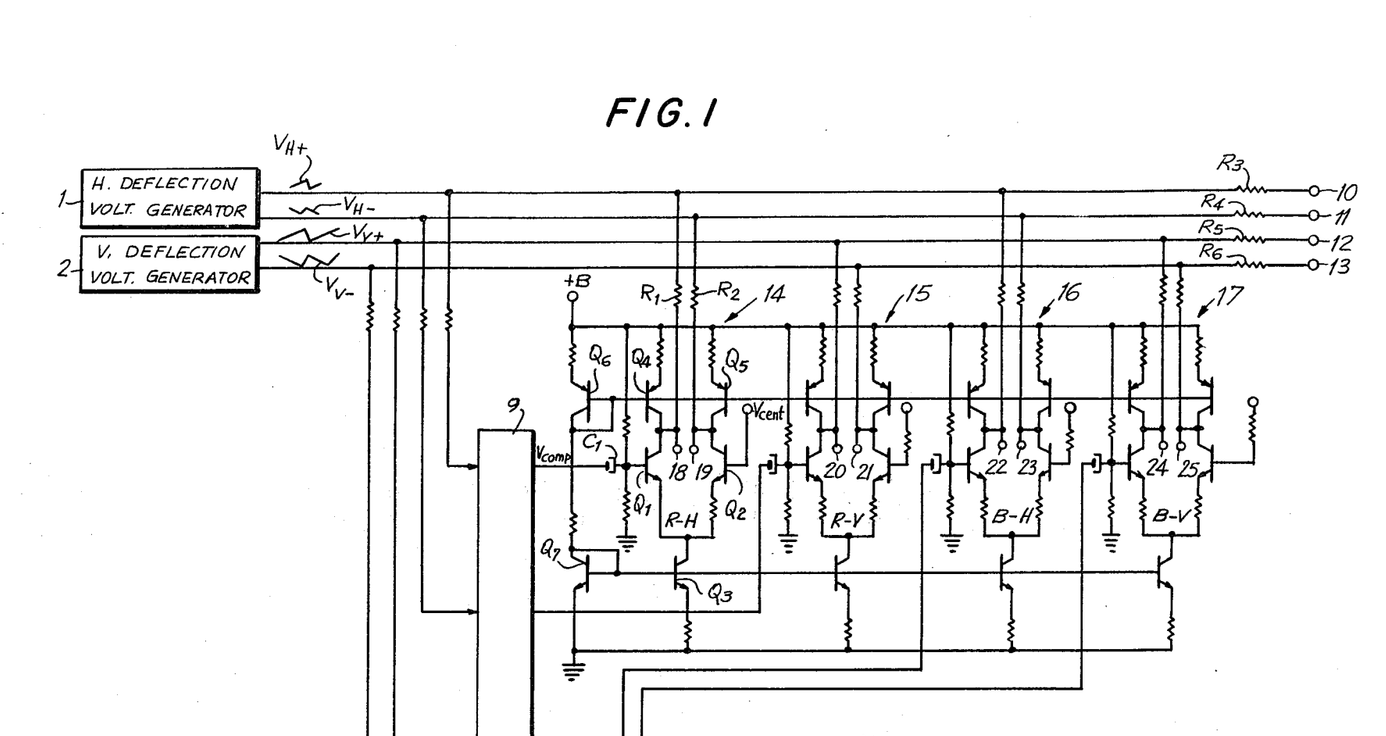
FIG. 1 is a schematic diagram of one previously-proposed correction circuit.
Figure 2:
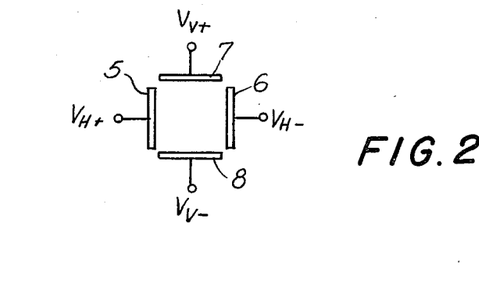
FIG. 2 is a schematic representation of electrostatic deflection plates with which the correction circuit of FIG. 1 can be used.

Referring now to the drawings, wherein like elements are identified by use of the same reference characters, FIG. 1 shows one previously-proposed scanning correction circuit used in connection with a three-tube color television camera. For the purpose of the present discussion, it will be assumed that each tube is provided with horizontal and vertical electrostatic deflection plates. It will be appreciated, however, that each tube may instead by provided with electromagnetic deflection yokes. Although the respective pick-up tubes are not illustrated, it is well known that such tubes are adapted to scan red, green, and blue electron beams, respectively, across photo conductive targets. The scanning of each beam is controlled by horizontal and vertical deflection plates which, as shown in FIG. 2, are comprised of horizontal deflection plates 5, 6 and vertical deflection plates 7, 8. A suitable horizontal deflection voltage generator 1 and a vertical deflection voltage generator 2 generate appropriate sawtooth-shaped horizontal and vertical voltage waveforms, respectively. The horizontal sawtooth voltage waveform is represented as a pair of differential horizontal deflection voltages $V_{H+}$ and $V_{H-}$. Likewise, the vertical sawtooth deflection voltage waveform is formed of differential vertical deflection voltages $V_{V+}$ and $V_{V-}$.

The deflection voltages may be considered as complements of each other. For example, when the horizontal deflection voltage $V_{H+}$ increases in the positive direction, its differential, or complement $V_{H-}$ increases in the negative direction. Thus, the voltage differential therebetween is seen to increase, thereby increasing the horizontal deflection of the electron beam. The foregoing also is applicable to the vertical deflection voltages $V_{V+}$ and $V_{V-}$, and to associated vertical deflection of the electron beam.

Proceeding further in FIG. 1, a compensating voltage generator 9 provides respective vertical and horizontal deflection compensating voltages, for each of the red and blue tubes, which serves to compensate for any misregistration in the rasters of the blue and red tube, considering the raster of the green tube as a reference.

The compensation voltages generator 9 is formed of elements, not shown here in detail, which have preset values determined in accordance with any mechanical differences in the deflection plates 5, 6, 7, and 8 of the various pick-up tubes.

The circuit of FIG. 1 is further provided with combining circuitry for combining the horizontal deflecting signals $V_{H+}$, $V_{H-}$ produced from the generator 1 and the horizontal deflection compensating voltage for each tube; and also for combining the vertical deflection compensating voltage for each tube. This combining circuitry is comprised of combining circuits 14, 15, 16, and 17, each of similar construction.

More particularly, combining circuit 14 is adapted to combine the horizontal deflecting signals $V_{H+}$, $V_{H-}$ and a particular horizontal deflection compensating voltage $V_{COMP}$ which is generated for the red tube to produce an adjusted horizontal deflecting signal to be applied to the horizontal deflection plates 5, 6 of the red tube. Likewise, combining circuit 15 combines the vertical deflecting signals $V_{V+}$, $V_{V-}$ and the vertical deflection compensating voltage generated by compensation voltage generator 9 for the red tube, so as to produce an adjusted vertical deflection signal which is applied to the vertical deflecting plates 7,8 of the red tube. In similar fashion, the combining circuit 16 provides an adjusted horizontal deflection signal which is applied to the horizontal deflecting plates of the blue tube; and the combining circuit 17 provides an adjusted vertical deflection signal which is applied to the vertical deflection plates of the blue tube. In the illustrated circuit, the horizontal and vertical deflecting signals which are produced by the generators 1, 2 are supplied, substantially as-is, to the horizontal and vertical deflection plates 5, 6, 7, 8 of the green tube.

The compensating voltage generator 9 synchronizes the compensating voltages with the horizontal and vertical deflecting signals $V_{H+}$, $V_{H-}$, $V_{V+}$, $V_{V-}$, and, for this purpose, these deflecting signals are supplied to respective inputs thereof.

Combining circuits 14, 15, 16 and 17 are of similar construction and, in the interest of brevity, only combining circuit 14 will be described in detail. This combining circuit 14 is comprised of a differential amplifier formed of differentially-connected transistors $Q_1$ and $Q_2$ whose emitter electrodes are both connected to a current source comprised of a transistor $Q_3$. As illustrated, emitter resistors couple each of the respective emitters of transistors $Q_1$ and $Q_2$ to the constant current transistor, $Q_3$, but such emitter resistors may be omitted. The collector electrodes of the differentially-connected transistors $Q_1$ and $Q_2$ are coupled to a source of operating potential $+B$ via current source transistors $Q_4$ and $Q_5$, respectively. These current source transistors $Q_4$ and $Q_5$ are illustrated as PNP transistors, whereas the current source transistor $Q_3$ as well as the differentially-connected transistors $Q_1$ and $Q_2$ are illustrated as NPN transistors. A diode-connected transistor $Q_6$ has its base-emitter circuit connected in parallel with the respective base-emitter circuits of the current source transistors $Q_4$ and $Q_5$. Likewise, a diode-connected transistor $Q_7$ has its base connected in common with the base of the current source transistor $Q_7$, and has its emitter grounded. These respective diode-connected transistors $Q_6$ and $Q_7$ are provided for temperature compensation.

The base electrodes of the differentially-connected transistors $Q_1$ and $Q_2$ are coupled to a pair of inputs to which the red horizontal compensating voltage $V_{COMP}$ is supplied. This horizontal compensating voltage may be supplied differentially across the base electrodes of transistors $Q_1$ and $Q_2$ or, as shown, the horizontal compensating voltage may be supplied to the base electrode of one of these transistors $Q_1$ and a predetermined DC centering voltage $V_{CENT}$ may be supplied, as a bias voltage, to the base electrode of the other transistor $Q_2$.

As shown in FIG. 1, a capacitor $C_1$ supplies the red horizontal compensating voltage $V_{COMP}$ to the base electrode of the transistor $Q_1$. Thus, the compensating voltage which is adapted to adjust the size, skew, and rotation of the raster scanned on the target of the red pick-up tube is supplied by capacitor $C_1$ to the base electrode of transistor $Q_8$. At the same time, the DC centering voltage $V_{CENT}$ is supplied to the base electrode of the transistor $Q_2$. In an alternative mode, this centering voltage can be supplied differentially across the base electrodes of transistors $Q_1$ and $Q_2$, or else supplied to the same base electrode as the compensating voltage $V_{COMP}$ (i.e., to the base electrode of transistor $Q_1$).

The collector electrodes of the transistors $Q_1$ and $Q_2$, respectively, are coupled to the generator 1 via resistors $R_1$ and $R_2$ to receive the horizontal deflecting signals $V_{H+}$ and $V_{H-}$, respectively. A pair of output terminals 18 and 19 are coupled respectively to the collector electrodes of the transistors $Q_1$ and $Q_2$ and these terminals 18 and 19 are connected to the horizontal deflection plates 5 and 6, respectively, of the red pick-up tube.

These output terminals 18 and 19 supply adjusted horizontal deflection signals to the deflection plates 5 and 6. The adjustment to these horizontal deflection signals is obtained as a function of the horizontal compensating voltage $V_{COMP}$ and the centering voltage $V_{CENT}$ supplied to the differential amplifier circuit which comprises the combining circuit 14.

The combining circuit 15 is of similar construction to combining circuit 14 and, as illustrated, a vertical compensating voltage is supplied to the differential amplifier which comprises this combining circuit. It also is seen that the vertical deflecting signals $V_{V+}$ and $V_{V-}$ are coupled to the respective collector electrodes of the differentially-connected transistors included in this differential amplifier. The vertical deflection signals which are supplied by combining circuit 15 to the vertical deflection plates of the red pick-up tube are adjusted as a function of the compensating and centering voltages that are supplied to the differential amplifier included in this combining circuit.

Combining circuits 16 and 17 are similar to aforementioned combining circuits 14 and 15. Output terminals of the combining circuits 16 and 17 are coupled to the horizontal and vertical deflection plates provided for the blue pick-up tube.

In the circuit of FIG. 1, it is assumed that the horizontal and vertical deflecting signals supplied from the deflecting signal generators 1 and 2 are supplied substantially directly to the horizontal and vertical deflection plates 5, 6, 7, and 8 of the green pick-up tube. Thus, the deflecting signal generators 1 is coupled by resistors $R_3$ and $R_4$ to output terminals 10 and 11, respectively, these output terminals being connected, in turn, to the horizontal deflection plates 5 and 6 included in the green pick-up tube. Likewise, the deflecting signal generator 2 is coupled via resistors $R_5$ and $R_6$ to output terminals 12 and 13, respectively; and these output terminals are, in turn, connected to the vertical deflection plates 7 and 8 of the green pick-up tube.

In this example, it is assumed that the horizontal and vertical deflection signals supplied to the horizontal and vertical deflection plates of the green pick-up tube function as "reference" deflecting signals. That is, these deflecting signals are established so as to provide the desired raster scan across the target of the green pick-up tube. For this purpose, the deflecting signal may be provided with suitable adjustment controls so as to generate the desired sawtooth waveform shape for each of the horizontal and vertical deflecting signals.

The adjusted horizontal deflecting signals provided at the output terminals 18 and 19 vary both with the compensating voltage $V_{COMP}$ and with the horizontal deflection voltages $V_{H+}$ and $V_{H-}$, as well as being offset in accordance with the centering voltage $V_{CENT}$.

With the deflection control circuit of FIG. 1, the horizontal and vertical deflecting signals supplied to each pick-up tube are adjusted substantially independently of each other; and the horizontal and vertical deflecting signals which are supplied to the green pick-up tube may be thought of as reference signals from which adjustments are made. That is, the raster scaned by the red pick-up tube may be adjusted independently of the rasters scanned by the remaining blue and green pick-up tubes. Likewise, the raster scanned by the blue pick-up tube may be adjusted without causing a concurrent, undesired adjustment in the rasters scanned by the red and green pick-up tubes.

Figure 3:
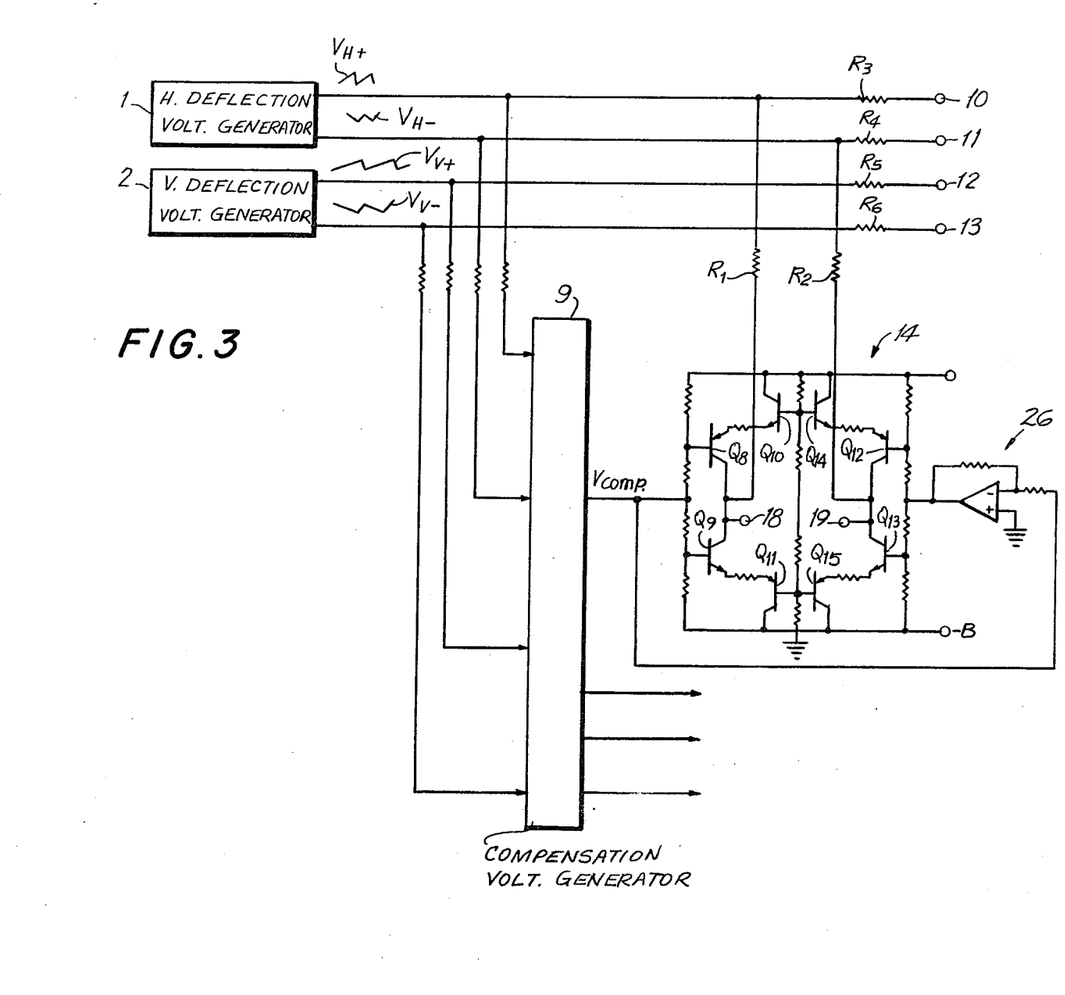
FIG. 3 is a schematic diagram of another previously-proposed correction circuit.

FIG. 3 illustrates another previously-proposed deflection control circuit, differing from that described in detail hereinabove only in respect to the particular construction of the combining circuits 14, 15, 16, and 17. For reasons of simplicity, only the horizontal combining circuit 14 for the red pick-up tube is illustrated, it being understood that the circuits 15–17 would be similar in construction.

In the combining circuit 14, a first pair of complementary transistors $Q_8$ and $Q_9$ are arranged as controllable current sources coupled in series with their collectors connected together to form a junction. The emitter of the transistor $Q_8$ is coupled through an emitter resistor to the emitter of a transistor $Q_{10}$, which functions as a constant voltage source. Similarly, the emitter of the transistor $Q_9$ is connected through an emitter resistor to the emitter of a transistor $Q_{11}$ which is also arranged as a constant voltage source.

A second pair of complementary transistors $Q_{12}$ and $Q_{13}$ are arranged in a similar fashion to the transistors $Q_8$ and $Q_9$, with their collectors connected together to form a junction, and with their emitters respectively connected through emitter resistors to the emitters of constant-voltage-source-arranged transistors $Q_{14}$ and $Q_{15}$.

The compensating voltage $V_{COMP}$ is applied from the compensation voltage generator 9 to the bases of the transistors $Q_8$ and $Q_9$. The compensating voltage $V_{COMP}$ is also applied through an inverter 26 to the bases of the transistors $Q_{12}$ and $Q_{13}$. The resistor $R_1$ is coupled between one output of the generator 1 and the junction of the collectors of the transistors $Q_8$ and $Q_9$, while the resistor $R_2$ is coupled between the complementary output of the generator 1 and the junction of the collectors of the transistors $Q_{12}$ and $Q_{13}$. Thus, the compensating voltage $V_{COMP}$ is applied to the bases of the transistors $Q_8$ and $Q_9$ while the horizontal deflection voltage $V_{H+}$ is applied through the resistor $R_1$ to the collectors of those transistors. Similarly, the compensation voltae $V_{COMP}$ is inverted and applied to the bases of the transistors $Q_{12}$ and $Q_{13}$, while the complementary horizontal deflection voltage $V_{H-}$ is applied through the resistor $R_2$ to the collectors thereof. Consequently, the output terminals 18 and 19, respectively coupled to the junctions of the collectors of the transistors $Q_8$ and $Q_9$ and of the transistors $Q_{12}$ and $Q_{13}$, provide complementary adjusted horizontal deflection voltages.

In the red-tube horizontal compensation circuit 14, the transistors $Q_8$ and $Q_9$ normally operate in a constant-current fashion while the transistors $Q_{12}$ and $Q_{13}$ similarly operate in a constant-current fashion. However, when the compensation voltage $V_{COMP}$ varies from a quiescent level, the current flowing through the transistor $Q_8$ increased by an amount $\Delta$, while the current flowing through the transistor $Q_9$ decreases by an equal amount $\Delta$. Accordingly, a current difference $2\Delta$ occurs between the currents flowing the transistors $Q_8$ and $Q_9$, and the latter difference current $2\Delta$ then flows through the resistor $R_1$. Thus the deflection voltage at the output terminal 18 increases by a voltage corresponding to $2\Delta R_1$. At the same time, the transistors $Q_{12}$ and $Q_{13}$ have a current difference of $-2\Delta$ and this current difference flows through the resistor $R_2$. A complementary compensating defletion voltage $-2\Delta R_2$ is provided at the output terminal 19.

When the direction of the compensating voltage $V_{COMP}$ is reversed, the senses of the above currents $2\Delta$ and $-2\Delta$ are also reversed.

Unfortunately, in the previously-proposed deflection control circuits the resistors $R_1$ and $R_2$ are connected from the deflection voltage generator 1 directly to the output terminals 18 and 19. Consequently, in order to keep the resistors $R_1$ and $R_2$ from combining with the inherent plate capacitance of the deflection plates 5 and 6 of the red pick-up tube and any stray capacitance and thereby integrating the horizontal deflecting signals $V_{H+}$ and $V_{H-}$, the values of the resistors $R_1$ and $R_2$ have to be kept low, usually equal to the values of the resistors $R_3$ and $R_4$. However, if these resistors $R_1$ and $R_2$ and the corresponding resistors in the remaining combining circuits 15, 16, and 17 are all assigned such low values, the horizontal and vertical deflection voltage generators 1 and 2 are presented with an excessively high current drain, and the generators 1 and 2 consume an undesirably high amount of power.

Consequently, it has been desired to provide an improved deflection control circuit which both presents a low resistance to the reflection plates 5, 6, 7, and 8 of the pick-up tubes and at the same time presents a comparatively small capacitive load to the horizontal and vertical deflection voltage generators 1 and 2. To that end the circuits according to this invention have been developed, and embodiments thereof are described below with reference to FIGS. 4 and 5.

Figure 4:
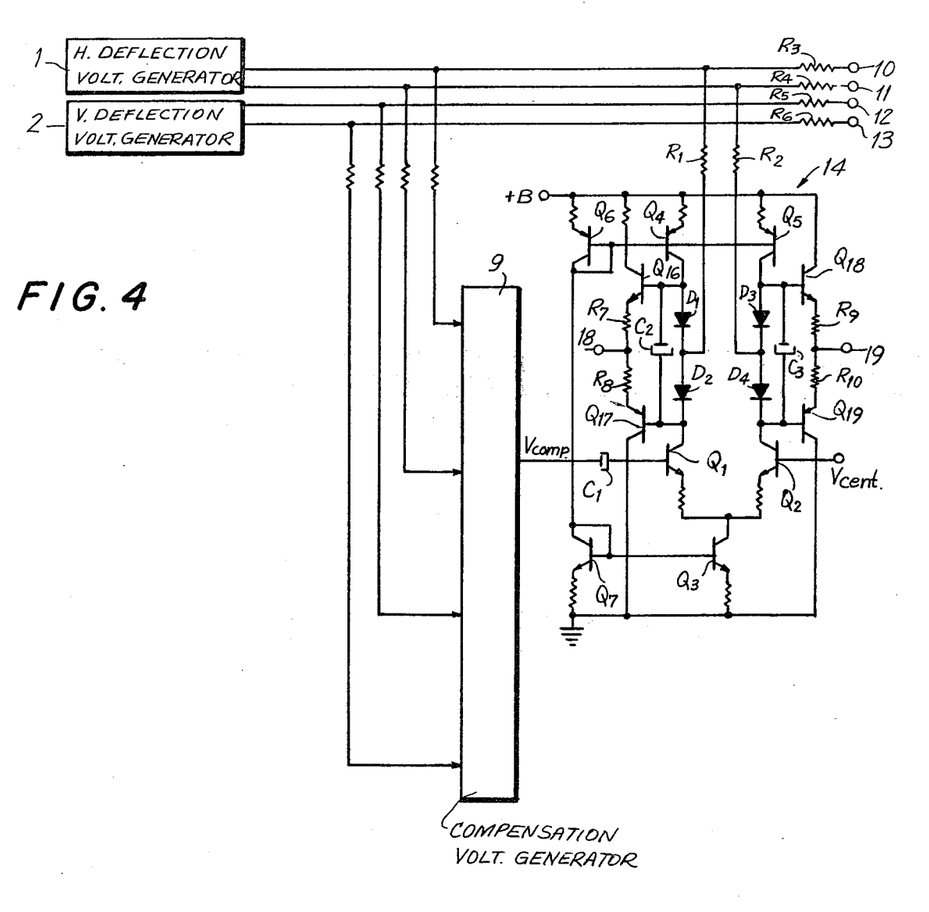
FIG. 4 is a schematic diagram of a first embodiment of the present invention.

A first embodiment of this invention, shown in FIG. 4, is generally similar to the deflection control circuit shown in FIG. 1, but the combining circuits 15, 16, and 17 hereof have been omitted for reasons of simplicity.

Unlike the previously-proposed circuit of FIG. 1, the resistors $R_1$ and $R_2$ are not connected directly to the output terminals 18 and 19 and the latter output terminals are not connected directly to the collector electrodes of the transistors $Q_1$, $Q_4$, and $Q_2$, $Q_5$, respectively.

Instead, a pair of biasing diodes $D_1$ and $D_2$ is connected in series between the collectors of the transistors $Q_1$ and $Q_4$, and a similar series pair of diodes $D_3$ and $D_4$ is connected in series between the collectors of the transistors $Q_2$ and $Q_5$. The resistors $R_1$ and $R_2$ are then connected to respective junctions defined between the diodes $D_1$, $D_2$ and $D_3$, $D_4$, respectively. An NPN transistor $Q_{16}$ and a PNP transistor $Q_{17}$ are arranged in a single-ended push-pull (SEPP) configuration, with their bases respectively connected to the collectors of the transistors $Q_1$ and $Q_4$. The collector of the transistor $Q_{16}$ is connected to the voltage supply +B, while the collector of the complementary transistor $Q_{17}$ is connected to ground. A pair of equal-value emitter resistors $R_7$ and $R_8$ are connected in series between the emitters of the transistors $Q_{16}$ and $Q_{17}$, with a junction defined between these resistors $R_7$ and $R_8$ being connected to the output terminal 18.

A coupling capacitor $C_2$ joins the bases of these transistors $Q_{16}$ and $Q_{17}$.

A similar SEPP arrangement of complementary transistors $Q_{18}$ and $Q_{19}$ is also provided with respective bases coupled to the collectors of the transistors $Q_2$ and $Q_5$, and with its emitters joined by a series arrangement of equal-value emitter resistors $R_9$ and $R_{10}$. A junction formed between the resistors $R_9$ and $R_{10}$ is coupled to the output terminal 19 and a coupling capacitor $C_3$ joins the bases of the transistors $Q_{18}$ and $Q_{19}$.

The further combining circuits 15-17, although not shown here in detail, all have similar SEPP-configured pairs of complementary transistors.

With the arrangement according to this embodiment of the invention, because the resistor $R_1$ is separated by the diodes $D_1$, $D_2$, the transistors $Q_{16}$, $Q_{17}$, and the resistors $R_7$, $R_8$, from the output terminal 18, the value of the resistor $R_1$ can be selected to be comparatively high to minimize the consumption of power in the horizontal deflection voltage generator 1. At the same time, the emitter resistors $R_7$ and $R_8$ can be selected to have a comparatively low value, so that the waveform of the adjusted horizontal deflection voltage, delivered at the terminal 18 to the deflection plate 5, will be substantially free of any distortion due to integration thereof.

Figure 5:
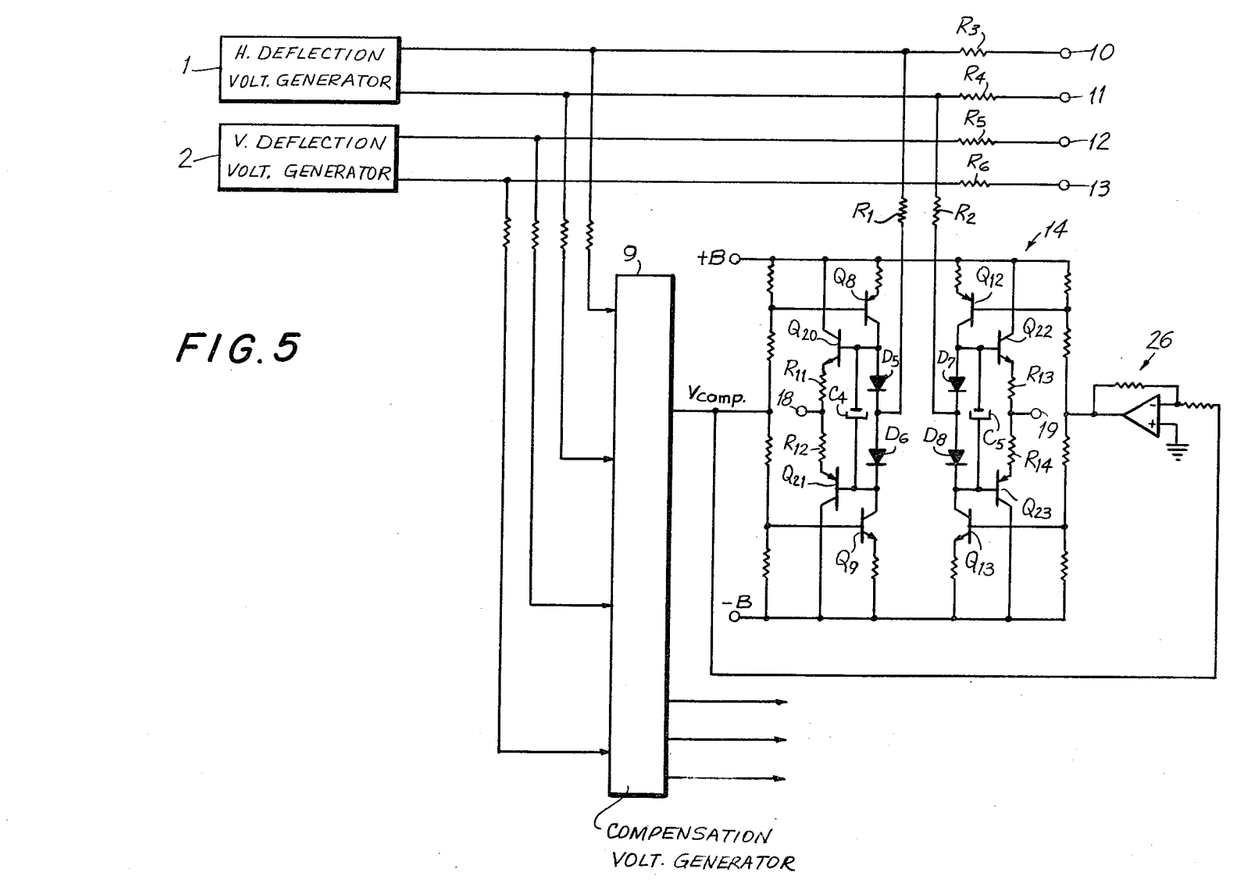
FIG. 5 is a schematic diagram of a second embodiment of the present invention.

Another embodiment of this invention is illustrated in FIG. 5. This embodiment is generally similar to the previously-proposed deflection control circuit shown in FIG. 3, but contains circuit improvements similar to those shown in the embodiment of FIG. 4.

In this embodiment, a pair of biasing diodes $D_5$ and $D_6$ are connected in series between the collectors of the transistors $Q_8$ and $Q_9$ while another similar pair of diodes $D_7$ and $D_8$ are connected in series between the collectors of the transistors $Q_{12}$ and $Q_{13}$.

An NPN transistor $Q_{20}$ and a PNP transistor $Q_{21}$ are connected in an SEPP configuration with their bases respectively coupled to the collectors of the transistors $Q_8$ and $Q_9$, and with their collectors respectively connected to the voltage sources +B and −B. The emitters of these transistors $Q_8$ and $Q_9$ are connected by a series arrangement of emitter resistors $R_{11}$ and $R_{12}$. These resistors $R_{11}$ and $R_{12}$ define a junction therebetween connected to the output terminal 18. A coupling capacitor $C_4$ joins the bases of the transistors $Q_{20}$ and $Q_{21}$.

A similar SEPP arrangement of complementary transistors $Q_{22}$ and $Q_{23}$ is provided with respective bases coupled to the collectors of the transistors $Q_{12}$ and $Q_{13}$, and with respective emitters joined by a series arrangement of resistors $R_{13}$ and $R_{14}$, a junction between which is connected to the output terminal 19. A capacitor $C_5$ bridges between the bases of the transistors $Q_{22}$ and $Q_{23}$.

In the embodiment of FIG. 5, the constant-voltage-source transistors $Q_{10}$, $Q_{11}$, $Q_{14}$, and $Q_{15}$ have been omitted, but these transistors could have been optionally included.

It is to be understood that the further combining circuits 15, 16, and 17 for the vertical deflection voltage $V_{V+}$ and $V_{V-}$ for the red pick-up tube and for the horizontal deflection voltages $V_{H+}$, $V_{H-}$ and the vertical deflection voltages $V_{V+}$, $V_{V-}$ for the blue pick-up tube would have generally the same configuration as that illustrated in FIG. 5.

It is also possible that the transistors $Q_9$ and $Q_{13}$ of the FIG. 5 embodiment could optionally be arranged as constant current sources, with the correcting voltage $V_{COMP}$ being applied only to the other transistors $Q_8$ and $Q_{12}$.

The embodiment of FIG. 5 has generally the same advantages as the embodiment of FIG. 4, and likewise achieves the benefits of a minimum of current drain to the horizontal and vertical deflection voltage generators 1 and 2, without sacrificing sharpness of the adjusted deflection signals delivered from the output terminals 18 and 19. That is, the resistors $R_1$ and $R_2$ can be selected to be relatively large relative to the resistors $R_{11}$, $R_{12}$, $R_{13}$, and $R_{14}$.

While the above embodiments of this invention have been described in detail herein with reference to the accompanying drawings, it is to be understood that the invention is not limited to those precise embodiments, and that various changes and modifications can be effected therein by one skilled in the art without departure from the scope and spirit of this invention, as defined in the appended claims.

What is claimed is:

1. Apparatus for correcting scanning of an electron beam which is scanned in respective horizontal and vertical directions in at least one pickup tube of a television camera having a plurality of pickup tubes; comprising a source of horizontal and vertical deflecting signals having respective outlets supplying said deflecting signals;

means for supplying said horizontal and vertical deflecting signals to respective horizontal and vertical deflection inputs of a predetermined one of said pickup tubes;

compensating voltage generating means having an input coupled to receive said horizontal and vertical deflecting signals and outputs providing respective deflection compensating voltages for selected ones of said pickup tubes; and combining means for combining said respective deflection compensating voltages with corresponding ones of said horizontal and vertical deflecting signals to generate adjusted horizontal and vertical deflecting signals for application to the horizontal and vertical deflection inputs of said selected pickup tubes; said combining means including transistor means having an input electrode coupled to receive the associated deflection compensating voltage and an output electrode coupled through a load resistor to one of said outputs of said source of horizontal and vertical deflecting signals; and a pair of complementary transistors arranged in single-ended push-pull configuration, said complementary transistors having bases coupled to said output electrode of said transistor means and emitters coupled through respective emitter resistors to one of the deflection inputs of one said selected pickup tubes.

2. Apparatus according to claim 1, wherein said transistor means includes another pair of complementary transistors, each having a base and a collector, with the base of one thereof coupled to an output of said compensating voltage generating means and the base of the other thereof coupled to a point of reference potential, and with the collectors thereof each connected to the base of a respective one of the pair of transistors arranged in single-ended push-pull configuration; and a pair of diodes coupled in series between the collectors of said other pair of complementary transistors and forming a junction therebetween, said junction being connected to said load resistor.

3. Apparatus according to claim 1, wherein said transistor means includes a pair of transistors coupled in differential configuration, each such transistors having a collector, an emitter, and a base, with the emitters thereof coupled together to a constant-current source, the base of one thereof coupled to an output of said compensating voltage generating means, the base of the other thereof coupled to a point of reference potential, and the collector of one thereof coupled to the bases of said pair of complementary transistors; and wherein said combining means further includes another pair of complementary transistors arranged in single-ended push-pull configuration, the same having respective bases coupled to the collector of said other of the pair of transistors connected in differential configuration, and emitters coupled through respective emitter resistors to another deflection input of said one of said selected pickup tubes and complementary to said one of the deflection inputs thereof.

4. Apparatus according to claim 1, wherein said combining means further includes a coupling capacitor joining the bases of said pair of complementary transistors.

5. Apparatus according to claim 4, wherein said combining means further includes a series-connected pair of biasing diodes coupled between the bases of said pair of complementary transistors and defining a junction therebetween, said junction being connected to said load resistor.

6. Apparatus according to claim 1, wherein said transistor means includes another pair of complementary transistors each having an emitter coupled to a respective point of source voltage, a base coupled to an output of said compensating voltage generating means, and a collector coupled to the base of a respective one of the first-mentioned pair of complementary transistors and to said load resistor.

7. Apparatus according to claim 6, wherein said combining means further includes a series-connected pair of diodes bridging the collectors of said other pair of transistors and defining a junction point therebetween connected to said load resistor.

8. Apparatus according to claim 7, wherein said combining means further includes an inverter having an input coupled to said output of said compensating voltage means and an output; a third pair of complementary transistors each having an emitter coupled to said respective point of source voltage, a base coupled to the output of said inverter, and a collector; another series-connected pair of diodes bridging the collectors of said third pair of complementary transistors and defining a junction point therebetween; another load resistor connected between the junction point of said other pair of diodes and another of said outlets of said source of horizontal and vertical deflecting signals complementary to said one outlet; and a fourth pair of complementary transistors arranged in single-ended push-pull configuration, said fourth pair of complementary transistors having bases coupled respectively to the collectors of said third pair of transistors, and emitters coupled through respective emitter resistors to another deflection input of said one of said selected pickup tubes complementary to said one deflection input thereof.

9. Apparatus according to claim 8, wherein said combining means further includes another coupling capacitor bridging the bases of said fourth pair of complementary transistors.

10. Apparatus according to claim 1, wherein said respective emitter resistors are connected in series between the emitters of said complementary transistors to define a junction therebetween, with said junction being connected to said one deflection input.

* * * * *

UNITED STATES PATENT OFFICE
CERTIFICATE OF CORRECTION

Patent No. 4,409,613           Dated October 11, 1983

Inventor(s)   Nakamura et al.

It is certified that error appears in the above-identified patent and that said Letters Patent are hereby corrected as shown below:

On the title page,

Item [73], change "The United States of America as represented by the U.S. Department of Energy, Washington, D.C." to --Sony Corporation, Tokyo, Japan--.

For the Attorney, Agent or Firm, change "Earl L. Larcher; Stephen D. Hamel; Richard G. Besha" to --Lewis H. Eslinger; Alvin Sinderbrand--.

Signed and Sealed this

Third Day of April 1984

[SEAL]

Attest:

GERALD J. MOSSINGHOFF

Attesting Officer     Commissioner of Patents and Trademarks